Sept. 27, 1955 A. WANTING 2,719,239
MOTOR HOUSING AND CORE ASSEMBLY AND
METHOD OF CONSTRUCTING SAME
Filed Feb. 9, 1953
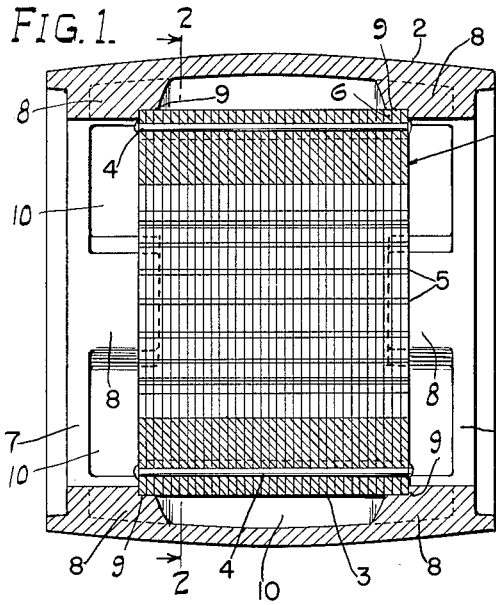
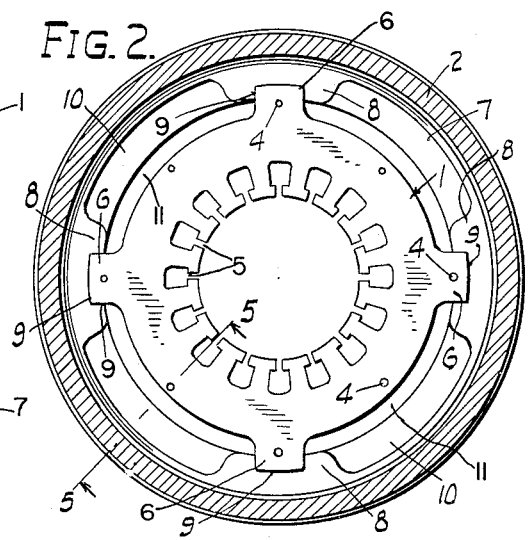
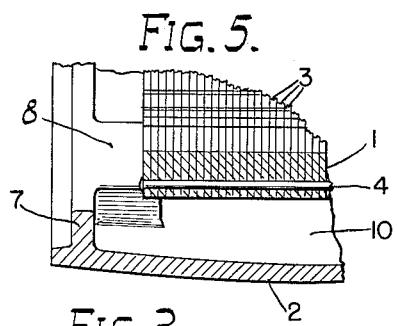
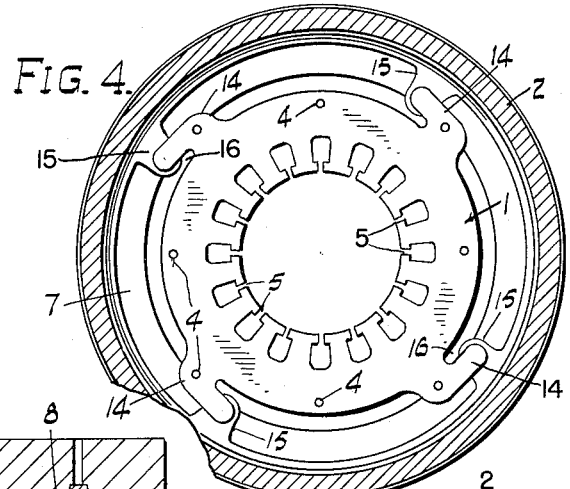
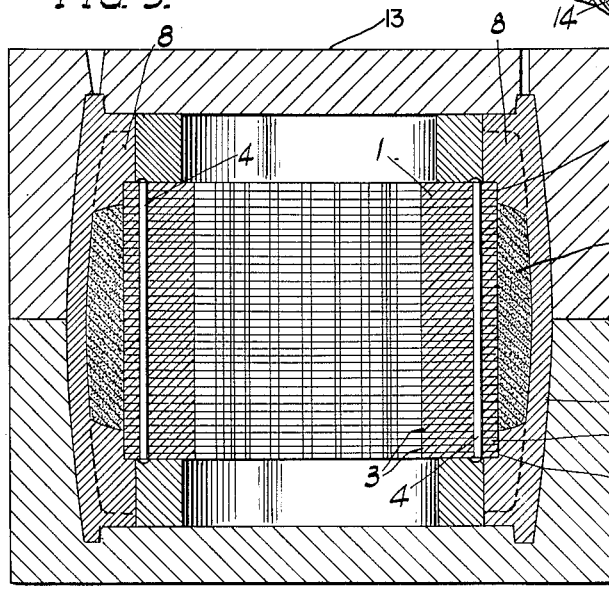
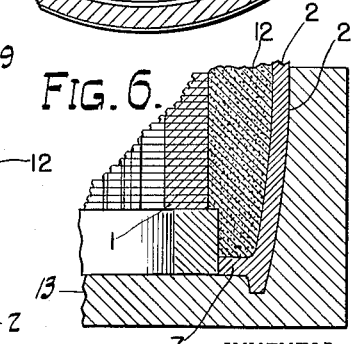
INVENTOR.
ANTON WANTING
BY Andrus & Seeales
ATTORNEYS.

United States Patent Office 2,719,239
Patented Sept. 27, 1955

2,719,239

MOTOR HOUSING AND CORE ASSEMBLY AND METHOD OF CONSTRUCTING SAME

Anton Wanting, Alhambra, Calif., assignor to A. O. Smith Corporation, Milwaukee, Wis., a corporation of New York Application February 9, 1953, Serial No. 335,843

9 Claims. (Cl. 310—258)

This invention relates to electrical apparatus and more particularly to a method and apparatus for making an electric motor or generator having a stator core with a housing cast thereon.

In the usual casting of the housing of an electric motor or generator a major problem has been to prevent an excessive strain on the core laminations around which the housing is cast upon the cooling of the cast metal, and thereby altering the magnetic performance of the laminations.

An object of this invention is to provide an improved core for electrical apparatus comprising assembled laminations of a special shape so that strain on the laminations will be greatly reduced upon cooling of the cast metal housing, thereby minimizing any detrimental effect on the magnetic performance of the core.

Another object is to provide a stator core that is efficiently air cooled in service.

According to this invention the laminations are provided with a plurality of circumferentially spaced ears and the housing is cast about the laminations in a manner to engage the stack of laminations at the ears only, and also only at the ends of the stack.

Other objects and advantages of the invention will appear in the course of the following description of the drawing.

In the drawing:

Figure 1 is an axial section of the invention showing the attachment of the cast housing to the stack of laminations;

Fig. 2 is a transverse section taken along line 2—2 of Figure 1;

Fig. 3 is an axial section of the assembled stator core as disposed in the casting mold;

Fig. 4 is a view similar to Fig. 2 showing another embodiment of this invention wherein the shape of the ears on the laminations take a different form.

Fig. 5 is a fragmentary view taken on line 5—5 of Fig. 2; and

Fig. 6 is a detail section taken on a line similar to Fig. 5 and showing the core and housing in the casting operation.

Referring to the drawing there is shown a part of an electrical motor comprising a stator core 1 secured within a cast housing 2.

The stator core 1 is formed of a plurality of generally annular laminations 3 disposed in axial alignment and welded or riveted together. Figure 1 illustrates the laminations secured by rivets 4. The inner periphery of laminations 3 have a plurality of spaced and aligned slots 5 in which suitable windings, not shown, may be disposed. The outer periphery of laminations 3 are provided with a plurality of circumferentially spaced, radially extending ears or projections 6. The ears are longitudinally aligned along the outer periphery of the core to form ridges thereon. The embodiment shown in Fig. 2 illustrates laminations formed with four ears 6.

The housing 2 which is formed of cast iron or other suitable metal to a generally cylindrical shape, has a pair of annular inwardly extending flanges 7 adjacent each end. A plurality of ribs 8 extend inwardly at even spaced intervals from shell 2 and flanges 7. The ribs extending from flange 7 on one end of housing 2 are longitudinally aligned with corresponding ribs extending from the flange on the opposite end of housing 2. Each rib 8 has a recess 9 to receive the projections 6 of the end laminations 3 of the stator core 1 and secure the core within the housing. The number and location of the ribs 8 correspond to the number and location of the longitudinally aligned projections 6 on the periphery of the stator core 1. The embodiment shown in Fig. 2 illustrates four ribs 8 at each end of housing 2.

Between ribs 8 and annular air space 10 is provided housing 2 and lamination projections 6. Similarly clearance spaces 11 are also provided between housing 2 and laminations 3 between the projections 6. The annular air space 10 and longitudinal clearance spaces 11 intersect and cooperate to air cool the core during operation.

In constructing the motor housing and core assembly a plurality of laminations 3 are initially stacked in axial alignment as hereinbefore described and the laminations are secured together to form the solid stator core 1. The assembled core 1 is then inserted in a sand core box, not shown, and a sand core 12 is built around core 1. The design of the core box is such that the end ears 6 on the laminations 3 project out of the sand core and remain exposed. The stator core 1 and the molded sand core 12 are then baked together in an oven, not shown. The stator core 1 and sand core 12 are next inserted within the mold 13. Proper gates and risers are provided for the housing casting operation and the metal forming the housing 2 is then poured into mold 13. In pouring the casting, the molten metal contacts the exposed ears of the end laminations 3 and forms around such ears. As the cast metal contracts on freezing the stator core is held securely in the motor housing 2 with the end ears 6 of the laminations disposed in recesses 9 of ribs 8. Upon cooling sand core 12 is knocked out to provide the air space 10 and clearance spaces 11 previously described.

In holding the core 1 securely in housing 2 by engaging only the end ears of the assembled laminations strain on laminations 3 during freezing and contraction of the metal is greatly reduced and detrimental effect of the casting operation on the magnetic performance of the core 1 is minimized. The stator core and housing assembly made according to the present invention provides the additional advantage of better ventilation of the stator core during operation of the apparatus since stator core 1 is completely surrounded by the air space 10 and clearance spaces 11.

A second embodiment of the invention is shown in Fig. 4 wherein the ears 14 on the laminations 3 assume a different shape. The ears project outwardly a slight distance from the outer periphery of the laminations and then are bent at a substantially near right angle for a distance great enough to provide sufficient contact with the ribs 15 on the cast housing 2. This construction provides a strain absorbing space or slot 16 between the ears and body of the laminations so that the aligned ears 14 may bend toward the respective spaces 16 when the cast metal housing 2 shrinks on freezing. This greatly reduces the strain on the laminations and thereby minimizes the detrimental effect of the strain on the magnetic performance of the stator core 1.

Both embodiments of the invention in addition to the previously stated advantages provided a minimum of engagement between the core 1 and housing 2 so that the laminations are relatively free to expand and contract in service and the magnetic performance of core 1 is not affected to any substantial extent by housing 2.

Various embodiments of the invention may be employed within the scope of the following claims:

What I claim is:

1. An electrical apparatus which comprises a plurality of laminations stacked together to provide a core, a plurality of circumferentially spaced projections extending from the periphery of the core at least at the end portions thereof, and a housing cast around said core with the body portion of the housing being spaced from the core and the ends of the housing engaging only the said projecting end portions of the core to securely hold the core in the housing when the casting of the housing is completed.

2. An electrical apparatus which comprises a plurality of laminations stacked together to provide a core, a plurality of circumferentially spaced projections extending from the periphery of the core at least at the end portions thereof, means to secure the laminations together, and a cast housing surrounding said core with the body portion of the housing being spaced from the core and the ends of the housing having spaced internal ribs with recesses therein for receiving only said projections of the core to securely hold the core in the housing when the casting of the housing is completed.

3. In electrical apparatus, a metal core provided by a stack of generally annular laminations, each of said laminations having a plurality of circumferentially spaced radially projecting ears on the outer periphery thereof with said ears being aligned longitudinally with corresponding ears of adjacent laminations, and a housing cast around the stator core removed from the body portion of the core but disposed in engagement with the ears of the end laminations of the stator core to hold the core securely within said housing, the said ears absorbing the strains due to shrinkage on freezing of the cast metal.

4. In electrical apparatus, a stator core formed of a plurality of laminations with each lamination having a generally annular body portion and a plurality of circumferentially spaced ears on the outer periphery of said body portion, said body portion and said ears of each lamination being longitudinally aligned with the body portion and corresponding ears of adjacent laminations, and a housing cast around the core of a generally cylindrical shape and having internal ribs at opposite ends corresponding to the longitudinally aligned ears of the laminations of the stator core, said ribs having recesses to receive only the ears of the end laminations of said stator core to securely hold the stator core in the housing, the ears on the laminations absorbing the strains due to shrinkage on freezing of the cast metal to thereby reduce the strains on said body portions of the laminations and minimize the detrimental effect of the strains on the magnetic performance of the said stator core in service.

5. In an electrical apparatus, a stator core provided from a stack of laminations with each lamination having a generally annular body portion and a plurality of circumferentially spaced ears on the outer periphery of said body portion, said body portion and ears of each lamination being longitudinally aligned with the body portion and corresponding ears of adjacent laminations, and a housing member cast around said core with an internal flange at the ends of said housing and internal ribs extending from the flanges and spaced circumferentially about the housing to correspond to the number of said longitudinally aligned ears on the stator core, each rib being spaced longitudinally from an opposite rib, said ribs having recess therein to receive only the ears on the end laminations of the stator core to secure said core within said housing and to provide a generally annular air space around the central portion of the core to carry away the heat generated in said core during operation.

6. In electrical apparatus, a stator core having a plurality of laminations with each lamination comprising a generally annular body portion and a plurality of circumferentially spaced ears on the outer periphery of said body portion, said ears extending radially from said body portion and being bent angularly to the radially extending portion to provide slots between the ears and body portions of the laminations, said body portion and ears of each lamination being longitudinally aligned with the body portion and corresponding ears of adjacent laminations, and a housing member cast around the stator core in confining engagement with only the ears of the end laminations of the stator core to hold the core within said housing, said ears and slots effecting absorption of stresses developed on shrinkage and freezing of the housing in the casting operation.

7. In a method of making a stator core having a housing cast thereon for electrical apparatus, which comprises assembling in flatwise relation a stack of generally annular laminations having a plurality of circumferentially spaced ears on the outer periphery thereof with the ears of each lamination being aligned with ears on adjacent laminations, securing said laminations together to form said stator core, disposing a sand core around said stator core and leaving exposed only the ears of the end laminations, casting a housing member around said stator and said cores with said housing member contacting said stator core at the said exposed ears to secure the stator core within said housing member, and then removing the sand mold between the body portion of the core and housing to provide an air space therebetween for cooling of the core in service.

8. An electrical apparatus, which comprises a plurality of laminations secured together to provide a complete core member, a housing member cast around said core member and being radially spaced therefrom, and peripherally spaced and independent means extending radially from at least one of said members into engagement with the other of said members to securely hold the core member within the housing member when the casting of the housing member is completed.

9. In an electrical apparatus, a plurality of laminations stacked together to provide a core member, a housing member cast around said core member with the body portion of the housing member spaced from the core member to form an uninterrupted air passage around the core, and a plurality of circumferentially spaced projections extending inwardly from the end portions of the housing member into engagement with complementary surfaces of the core member, said projections securely holding the core member and housing member together when the casting of the housing is completed, and the space between the body portion of the housing member and the core member providing for circulation of air and cooling of the apparatus in service.

References Cited in the file of this patent

UNITED STATES PATENTS

| 2,306,769 | Wilhide | Dec. 29, 1942 |
| 2,488,458 | Walton et al. | Nov. 15, 1949 |

FOREIGN PATENTS

| 181,867 | Great Britain | June 29, 1922 |
| 201,448 | Germany | Sept. 5, 1908 |